2,895,925

ANION-EXCHANGE RESIN CONTAINING SULFONIUM GROUPS

Jesse C. H. Hwa, Levittown, Pa., assignor to Rohm & Haas Company, Philadelphia, Pa., a corporation of Delaware No Drawing. Application February 2, 1956
Serial No. 562,945

7 Claims. (Cl. 260—2.1)

This invention relates to strongly basic anion-exchange resins which contain sulfonium groups as their functional, anion-exchanging groups. It also relates to the preparation of such resins which are particularly useful in the deionization of fluids and as catalysts in chemical reactions requiring an alkaline catalyst.

The products of this invention are obtained by reacting an organic sulfide with particles of a haloalkylated, cross-linked, insoluble copolymer of a monovinyl aromatic hydrocarbon and a compound which is copolymerizable with said monovinyl hydrocarbon and which contains at least two non-conjugated, vinylidene groups of the structure $CH_2=C<$.

The sulfides which are employed are those having the general formula, R'—S—R", in which R' is an alkyl group containing one to four carbon atoms or is an alkanol group containing one to four carbon atoms, and in which R" is an alkyl group containing one to four carbon atoms. The alkyl groups represented by R' and R" are, of course, the methyl group, the ethyl group, the isomeric propyl groups and the isomeric butyl groups. The alkanol groups represented by R' are the same alkyl groups in which one hydrogen atom is replaced by an hydroxyl group.

The haloalkylated, insoluble, cross-linked, resinous compounds which are reacted with the organic sulfides are themselves well-known (U.S. Patent No. 2,629,710). They are prepared by first making a cross-linked, insoluble, copolymer of a monovinyl hydrocarbon and a copolymerizable, cross-linking compound containing at least two vinylidene groups, $CH_2=C<$; and thereafter haloalkylating the resultant cross-linked copolymer by means of conventional haloalkylating agents.

Suitable monovinyl compounds include styrene, which is much preferred, vinyltoluene, vinylnaphthalene, ortho-, meta-, and para-ethyl styrenes, vinylanthracene, and homologues and isomers of the above. Suitable copolymerizable, cross-linking agents include divinylbenzene, which is much preferred, divinyltoluenes, divinylnaphthalenes, divinylethylbenzenes, divinylxylenes, trivinylbenzenes, diallyl esters such as diallyl phthalate and doubly unsaturated esters such as ethylene glycol diacrylate and dimethacrylate. What is required is that the cross-linking agent be copolymerizable with the monovinyl compound and that it contain a plurality of $CH_2=C<$ groups. As little as 0.5%, on a molar basis, of the cross-linking agent and as much as equal parts of the monovinyl compound and the cross-linking agent, on the same basis, can be used; but it is preferred that the cross-linker constitute from 0.5% to 15% of the copolymerizable mixture on a molar basis. Obviously mixtures of two or more monovinyl compounds and two or more cross-linking agents can be copolymerized if necessary or desirable.

The insoluble, cross-linked copolymers can be prepared by polymerizing the monomeric mixtures in bulk, in a solvent, in emulsion, or in suspension. Suspension polymerization, wherein a copolymerizable mixture is suspended by agitation in a medium such as water which is not a solvent for the monomers and is therein polymerized, is much preferred because it gives rise to products which are in the form of small discrete beads of spheroids. Since the copolymerization reaction is accelerated by heat and catalysts of the free-radical type, it is advisable to employ any convenient temperature above 50° C.—preferably a temperature from 50° C. to 90° C. in the case of suspension polymerization—and to use a catalyst. Suitable catalysts include dimethyl azobisisobutyrate, α,α'-bisazoisobutyronitrile, benzoyl peroxide, acetyl peroxide, lauroyl peroxides, tert-butyl hydroperoxide, di-tert-butyl peroxide, stearoyl peroxides, and "per-salts" such as ammonium perborate and ammonium persulfate. The catalysts are used in amounts from 0.2% to 5%—and preferably from 0.5% to 2%—based on the weight of the polymerizable compounds.

In the haloalkylation step, the cross-linked, insoluble, copolymer is reacted, for example, with a mixture of an aldehyde and hydrochloric acid or a mixture of a dihalide and a Friedel-Crafts catalyst. Methods of chloroalkylating which may be used for introducing the —$CH_2Cl$ group and which also serve as guides for introducing —$C_2H_4X$, —$C_3H_6X$, —$C_4H_8X$ groups, wherein X represents an atom of chlorine or bromine, are described in "Organic Reactions," vol. I, chapter 3, page 63 et seq. (John Wiley & Sons, Inc., New York city, 1942). Since the capacity of the final resin is proportional to the number of sulfonium groups which it contains and since the number of such groups cannot be more than the number of haloalkyl groups which are first introduced, it is most desirable that the haloalkylation reaction be carried as far as is conveniently possible. The extent of the haloalkylation reaction can be determined by a halogen analysis. Actually, in commercial production, it is preferred to employ a chloromethylated copolymer which is prepared, for example, by the use of chloromethyl methyl ether. The haloalkylated copolymers contain, attached to their aromatic nuclei, groups of the structure, $C_nH_{2n}$—X, in which $n$ is an integer of value one to four, and X is an atom of chlorine or bromine.

It is preferred that the reaction of the haloalkylated copolymer and the organic sulfide be carried out in the presence of an organic liquid which is a solvent for the organic sulfide and which is also capable of swelling the particles of the haloalkylated copolymer. Hydrocarbons, such as benzene or toluene, and halogenated hydrocarbons, such as ethylene dichloride or tribromoethane, are suitable for this purpose. The reaction takes place fairly readily and temperatures up to the boiling point of the reaction mixture can be used. The reaction which takes place is typified by the following equation which represents the reaction of a chloromethylated copolymer of styrene with methyl ethyl sulfide:

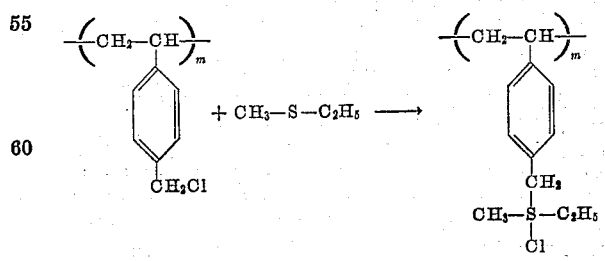

The products of this invention are strongly basic anion-exchange resins by virtue of containing sulfonium groups of the structure

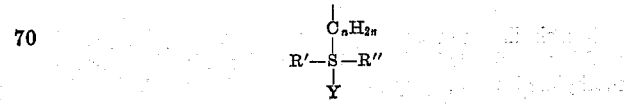

in which the characters $n$, R' and R" have the significance described above and Y is an anion such as a chloride or an hydroxyl ion. The sulfonium groups are attached to the aromatic nuclei of the insoluble, cross-linked copolymer. The resinous products are capable of exchanging the anion, represented by Y above, for other anions. Thus, they are converted to any desired anionic form by treatment with a solution containing the particular anion. Furthermore, when they are in the hydroxyl form, they are capable of splitting neutral salts such as sodium chloride and of exchanging their hydroxyl groups for the anions of said neutral salt. They also adsorb very weak acids and consequently can remove dissolved silica from aqueous solutions; and they are particularly useful in so-called "mixed bed" operations where they are mixed with a cation-exchanger and the resultant mixture is used to deionize fluids. The ease with which the resins can be regenerated makes them particularly useful in industrial applications.

The following examples serve to illustrate further the method of making the resinous compounds of this invention:

Example 1

A. Into a reactor equipped with thermometer, agitator and reflux condenser was charged 1500 ml. of water and 150 ml. of a 1.5% aqueous dispersion of magnesium silicate. Agitation was begun and a solution containing 390 grams of styrene, 10 grams of the technical grade of divinylbenzene (equivalent to approximately 4 grams of divinylbenzene and 6 grams of ethylstyrene) and 4 grams of benzoyl peroxide was added to the contents of the reactor. The stirred mixture was heated to 90° C. and held there for 1.5 hours after which it was heated to refluxing temperature and held there for an additional period of 1.5 hours. The mixture was cooled to room temperature and the particles of resin were separated from the liquid phase, thoroughly washed and finally dried in an oven at 125° C.

B. Next, 315 grams of the cross-linked copolymer prepared in Part A above was placed in a reactor equipped with thermometer, agitator and reflux condenser. This amount corresponds to 3.5 moles of styrene in the form of the cross-linked copolymer. Then 360 grams of chloromethyl methyl ether, $ClCH_2OCH_3$, and 3600 grams of ethylene dichloride were added and the mixture was stirred for one hour at about 30°. While the temperature was held between 30° and 40° C., a total of 150 grams of aluminum chloride was added slowly to the stirred mixture over a period of two hours. Thereafter the mixture was stirred for 8 hours at 30° to 40° C. Then to the mixture was added twice its volume of cold water; and stirring was continued for an hour. The beads of resin were separated, were washed to neutrality with water and finally were dried in an oven at 120° C.

C. Into a reactor equipped with thermometer, stirrer, and reflux condenser were charged 441 parts of chloromethylated beads of resin prepared as described above, 87 parts of methyl ethyl sulfide, 500 parts of water and 0.5 part of sodium iodide. The stirred mixture was heated to 70° C. and was held at 65° to 74° C. for 18 hours. Then the mixture was filtered and the wet beads were stripped of organic contaminants by steam distillation. The product had a capacity of 1.91 milliequivalents (meq.) per gram dry. When it was treated with sodium hydroxide, it was converted to the hydroxyl form; and it was then capable of splitting neutral salts; that is, it was able to exchange its hydroxyl ions for the anions, such as chloride ions, from solutions of neutral salts, such as sodium chloride.

Example 2

In a similar manner, 25 parts of n-butyl 2-hydroxyethyl sulfide was reacted with 115 parts of beads of a chloromethylated resin, prepared as above-described, in 100 parts of water. The steam-distilled product had an anion-exchange capacity of 0.57 meq. per gram dry.

Example 3

When bis(2-hydroxyethyl) sulfide was substituted for the 2-hydroxyethyl sulfide of Example 2, a resin was obtained which was strongly basic and which had a capacity of 0.5 meq. per gram dry.

I claim:

1. A strongly basic anion-exchange resin which comprises an insoluble cross-linked copolymer of a mixture of an aromatic monovinyl hydrocarbon and a copolymerizable cross-linking agent selected from the class consisting of acrylic and methacrylic esters of polyhydric alcohols, diallyl esters of dicarboxylic acids, and polyvinyl aromatic hydrocarbons, said cross-linking agent being present in an amount equal to 0.5 to 50 molar percent, based on the total moles of said monovinyl hydrocarbon and said cross-linking agent, said copolymer having attached to the aromatic nuclei thereof groups of the structure.

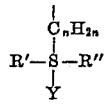

in which $n$ is an integer of value one to four, R' and R" are members of the class consisting of monohydroxy substituted alkyl groups which contain one to four carbon atoms, and Y is an anion.

2. A strongly basic anion-exchange resin which comprises an insoluble cross-linked copolymer of a mixture of an agent selected from the class consisting of acrylic and methacrylic esters of polyhydric alcohols, diallyl esters of dicarboxylic acids, and polyvinyl aromatic hydrocarbons, said cross-linking being groups of the structure $CH_2=C<$, said cross-linking agent being independently non-reactive with organic sulfides and further being present in an amount equal to 0.5 to 50 molar percent, based on the total moles of said monovinyl hydrocarbon and said cross-linking agent, said copolymer having attached to the aromatic nuclei thereof groups of the structure

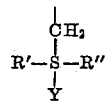

in which R' and R" are members of the class consisting of monohydroxy substituted alkyl groups which contain 1 to 4 carbon atoms, and Y is an anion.

3. A strongly basic anion-exchange resin which comprises an insoluble cross-linked copolymer of a mixture of styrene and divinylbenzene, said divinylbenzene being present in an amount equal to 0.5 to 50 molar percent, based on the total number of moles of said styrene and divinylbenzene; said copolymer having attached to the aromatic nuclei thereof groups of the structure

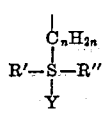

in which $n$ is an integer of value one to four, R' and R" are members of the class consisting of monohydroxy substituted alkyl groups which contain one to four carbon atoms, and Y is an anion.

4. A strongly basic anion-exchange resin which comprises an insoluble cross-linked copolymer of a mixture of styrene and divinylbenzene, said divinylbenzene being present in an amount equal to 0.5 to 50 molar percent, based on the total number of moles of said styrene and divinylbenzene; said copolymer having attached to the aromatic nuclei thereof groups of the structure $$R'-\overset{\overset{CH_2}{|}}{\underset{\underset{Y}{|}}{S}}-R''$$

in which R' and R'' are members of the class consisting of monohydroxy substituted alkyl groups which contain 1 to 4 carbon atoms, and Y is an anion.

5. A process for preparing strongly basic anion-exchange resins which comprises reacting (a) an organic sulfide of the formula $$R'-S-R''$$

in which R' and R'' are members of the class consisting of monohydroxy substitued alkyl groups which contain 1 to 4 carbon atoms, with (b) a haloalkylated copolymer of 50 percent to 99.5%, on a weight basis, of an aromatic monovinyl hydrocarbon and 0.5% to 50% of a copolymerizable cross-linking agent from the class consisting of acrylic and methacrylic esters of polyhydric alcohols, diallyl esters of dicarboxylic acids, and polyvinyl aromatic hydrocarbons, said copolymer having attached to the aromatic nuclei thereof groups of the structure $-C_nH_{2n}-Y$, in which $n$ is an integer of value 1 to 4 and Y is an atom of a halogen from the class consisting of chlorine and bromine.

6. A process for preparing strongly basic anion-exchange resins which comprises reacting (a) an organic sulfide of the formula $$R'-S-R''$$

in which R' and R'' are members of the class consisting of monohydroxy substituted alkyl groups which contain 1 to 4 carbon atoms, with (b) a chloromethylated copolymer of 50 percent to 99.5%, on a weight basis, of styrene and 0.5% to 50% of divinylbenzene, said copolymer having attached to the aromatic nuclei thereof groups of the structure $-CH_2Cl$.

7. A strongly basic anion-exchange resin which comprises an insoluble cross-linked copolymer of a mixture of styrene and divinylbenzene, said divinylbenzene being present in an amount equal to 0.5 to 50 molar percent, based on the total number of moles of said styrene and divinylbenzene; said copolymer having attached to the aromatic nuclei thereof groups of the structure $$HO-CH_2-CH_2-\overset{\overset{CH_2}{|}}{\underset{\underset{OH}{|}}{S}}-CH_2-CH_2-OH$$

References Cited in the file of this patent

UNITED STATES PATENTS

| | | |
|---|---|---|
| 2,136,178 | Carothers | Nov. 8, 1938 |
| 2,591,573 | McBurney | Apr. 1, 1952 |
| 2,768,990 | De Jong | Oct. 30, 1956 |

OTHER REFERENCES

Whitmore: "Organic Chemistry," page 162, Van Nostrand (1937).